United States Patent
Chen et al.

(10) Patent No.: US 12,418,670 B2
(45) Date of Patent: Sep. 16, 2025

(54) TEMPLATE-MATCHING BASED MERGE INDEX REORDERING FOR GEOMETRIC PARTITION MODE (GPM)

(71) Applicant: Tencent America LLC, Palo Alto, CA (US)

(72) Inventors: Lien-Fei Chen, Hsinchu (TW); Guichun Li, San Jose, CA (US); Xin Zhao, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 97 days.

(21) Appl. No.: 18/241,058

(22) Filed: Aug. 31, 2023

(65) Prior Publication Data

US 2024/0129506 A1    Apr. 18, 2024

Related U.S. Application Data

(60) Provisional application No. 63/416,401, filed on Oct. 14, 2022.

(51) Int. Cl.
| | |
|---|---|
| *H04N 19/44* | (2014.01) |
| *H04N 19/105* | (2014.01) |
| *H04N 19/132* | (2014.01) |
| *H04N 19/176* | (2014.01) |
| *H04N 19/88* | (2014.01) |

(52) U.S. Cl.
CPC ........... *H04N 19/44* (2014.11); *H04N 19/105* (2014.11); *H04N 19/132* (2014.11); *H04N 19/176* (2014.11); *H04N 19/88* (2014.11)

(58) Field of Classification Search
CPC .... H04N 19/44; H04N 19/105; H04N 19/132; H04N 19/176; H04N 19/88; H04N 19/119; H04N 19/52; H04N 19/137; H04N 19/70
See application file for complete search history.

(56) References Cited

U.S. PATENT DOCUMENTS

| | | | |
|---|---|---|---|
| 2020/0068218 A1* | 2/2020 | Chen | H04N 19/82 |
| 2020/0296414 A1* | 9/2020 | Park | H04N 19/176 |

(Continued)

OTHER PUBLICATIONS

International Search Report and Written Opinion issued Nov. 28, 2023 in Application No. PCT/US2023/073328, pp. 1-8.

(Continued)

*Primary Examiner* — Jared Walker
(74) *Attorney, Agent, or Firm* — ArentFox Schiff LLP

(57) ABSTRACT

A current block is partitioned into a first partition and a second partition. Template samples of the current block are split into a first template region adjacent to the first partition and a second template region adjacent to the second partition. A plurality of first candidate reference blocks is determined for the first partition. A plurality of second candidate reference blocks is determined for the second partition. At least one of the plurality of first candidate reference blocks and the plurality of second candidate reference blocks is reordered based on a size of the first template region of the template samples and a size of the second template region of the template samples. The current block is reconstructed based on a received index value and based on the reordered at least one of the plurality of first candidate reference blocks and the plurality of second candidate reference blocks.

20 Claims, 9 Drawing Sheets

(56) References Cited

U.S. PATENT DOCUMENTS

2021/0037238 A1\* 2/2021 Park .................. H04N 19/105
2022/0329822 A1\* 10/2022 Chang ................ H04N 19/46
2024/0073440 A1\* 2/2024 Xiu ................... H04N 19/1887

OTHER PUBLICATIONS

High Efficiency Video Coding, Rec. ITU-T H.265 v4 Dec. 2016, pp. 1-664.

ITU-T and ISO/IEC, "Versatile Video Coding", ITU-T Rec. H.266 and ISO/IEC 23090-3, 2020, pp. 1-516.

Y.-J. Chang, et. al., "Compression efficiency methods beyond VVC", ISO/IEC JTC1/SC29/WG11 JVET-U0100, Jan. 2021, pp. 1-13.

V. Seregin, et. al., "Exploration Experiment on Enhanced Compression beyond VVC capability", ISO/IEC JTC1/SC29/WG11 JVET-U2024, Jan. 2021, pp. 1-19.

R.-L. Liao, Y. Ye, X. Li, and J. Chen, "EE2-related: Combination of GPM and template matching", ISO/IEC JTC1/SC29/ WG11 JVET-V0117, Apr. 2021, pp. 1-2.

Y. Kidani, H. Kato, and K. Kawamura, "AHG12: GPM with inter and intra prediction", ISO/IEC JTC1/SC29/WG11 JVET-W0110, Jul. 2021, pp. 1-3.

C.-C. Chen, H. Huang, Y. Zhang, Z. Zhang, Y.- J. Chang, V. Seregin, and M. Karczewicz, "EE2-2.4: Template matching based reordering for GPM split mode", ISO/IEC JTC1/SC29 JVET-Z0056, Apr. 2022, pp. 1-2.

X. Xiu, C.-W. Kuo, X. Wang, R.-L. Liao, Y. Ye, X. Li, J. Chen, Z. Deng, K. Zhang, L. Zhang, N. Zhang, Y. Wang, Y.-J. Chang, H. Huang, V. Seregin, C.-C. Chen, M. Karczewicz, "EE2-related: Combination of EE2-3.3, EE2-3.4 and EE2-3.5," JVET Teleconference, 23rd meeting, document JVET-W0097, Jul. 2021, pp. 1-5.

Y. Kidani, H. Kato, K. Kawamura, H. Jang, S. Kim, J. Lim, Z. Deng, K. Zhang, L. Zhang, "EE2-3.1: GPM with inter and Intra prediction (JVET-X0166)" JVET Teleconference, 25th meeting, document JVET-Y0065, Jan. 2022, pp. 1-5.

Y. Kidani, H. Kato, K. Unno, and K. Kawamurn, "Non-EE2: Adaptive width for GPM blending area", ISO/IEC JTC1/SC29 JVET-Z0059, Apr. 2022, pp. 1-5.

H. Gao, X. Xiu, W. Chen, H.-J. Jhu, C.-W. Kuo, N. Yan, and X. Wang, "Non-EE2: Adaptive blending for GPM", ISO/IEC JTC1/SC29 JVET-Z0137, Apr. 2022, pp. 1-3.

M. Coban, et. al., "Algorithm description of Enhanced Compression Model 5 (ECM5)", ISO/IEC JTC1/SC29 JVET-Z2025, Apr. 2022, pp. 1-45.

H. Gao, S. Esenlik, E. Alshina, and E. Steinbach, "Geometric partitioning mode in versatile video coding: algorithm review and analysis," IEEE Trans. Circuits Syst. Video Technol., vol. 31, No. 9, pp. 3603-3617, Sep. 2021.

\* cited by examiner

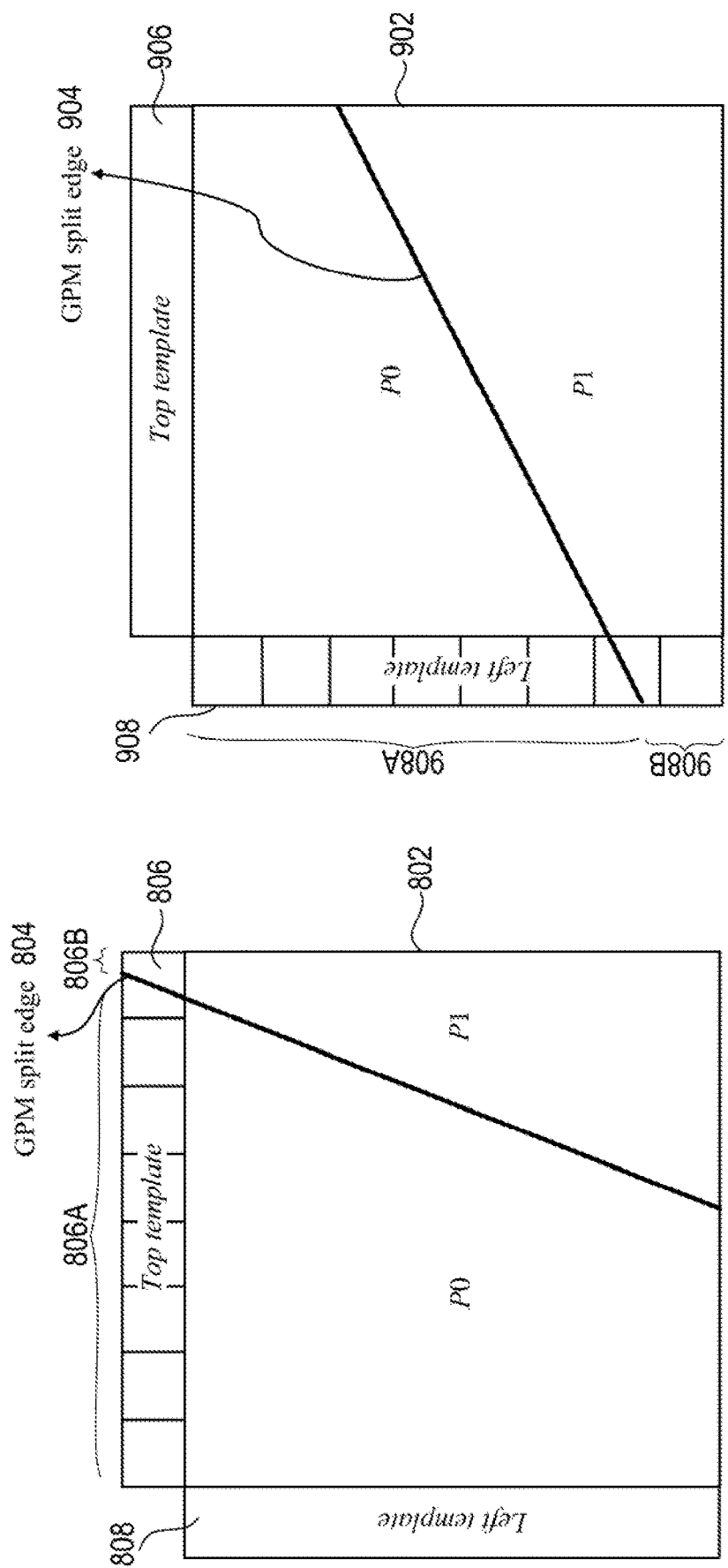

TEMPLATE-MATCHING BASED MERGE INDEX REORDERING FOR GEOMETRIC PARTITION MODE (GPM)

INCORPORATION BY REFERENCE

The present application claims the benefit of priority to U.S. Provisional Application No. 63/416,401, "Template-Matching Based Merge Index Reordering For Geometric Partition Mode (GPM)" filed on Oct. 14, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be generally indicated by a motion vector (MV).

SUMMARY

Aspects of the disclosure includes methods and apparatuses for video encoding/decoding. In some examples, an apparatus for video decoding includes processing circuitry.

According to an aspect of the disclosure, a method of video decoding performed in a video decoder is provided. In the method, a video bitstream including a current block in a current frame and template samples of the current block is received. The template samples include a top template along a top side of the current block and a left template along a left side of the current block. The current block is partitioned into a first partition and a second partition, and the template samples are split into a first template region adjacent to the first partition and a second template region adjacent to the second partition. A plurality of first candidate reference blocks is determined for the first partition and a plurality of second candidate reference blocks is determined for the second partition. Each first candidate reference block has a respective first candidate template corresponding to a shape of the first template region, and each second candidate reference block has a respective second candidate template corresponding to a shape of the second template region. At least one of the plurality of first candidate reference blocks and the plurality of second candidate reference blocks is reordered based on a size of the first template region of the template samples and a size of the second template region of the template samples. The current block is reconstructed based on an index value received in the video bitstream and based on the reordered at least one of the plurality of first candidate reference blocks and the plurality of second candidate reference blocks.

In an example, the plurality of first candidate reference blocks for the first partition of the current block and the plurality of second candidate reference blocks for the second partition of the current block are determined based on candidate reference blocks indicated by motion vectors (MVs) in a first reference list and in a second reference list.

In an example, the plurality of first candidate reference blocks for the first partition of the current block and the plurality of second candidate reference blocks for the second partition of the current block are determined based on one of non-adjacent blocks and blocks in collocated reference frames of the current frame indicated by temporal motion vectors.

In an aspect, a template-matching (TM) difference between the first template region of the template samples and each of the first candidate templates is determined. A TM difference between the second template region of the template samples and each of the second candidate templates is determined. The plurality of first candidate reference blocks for the first partition is reordered based on an ascending order of the TM differences between the first template region of the template samples and the first candidate templates. The plurality of second candidate reference blocks for the second partition is reordered based on an ascending order of the TM differences between the second template region of the template samples and the second candidate templates.

In an aspect, based on the top template being split into a first part and a second part, the first template region of the template samples including the left template and the first part of the top template, and the second template region of the template samples including the second part of the top template, the plurality of first candidate reference blocks for the first partition is reordered based on a number of samples in a sample row of the first part of the top template being larger than a threshold value. The plurality of second candidate reference blocks for the second partition is reordered based on a number of samples in a sample row of the second part of the top template being larger than the threshold value.

In an aspect, based on the top template being split into a first part and a second part, the first template region of the template samples including the left template and the first part of the top template, and the second template region of the template samples including the second part of the top template, the plurality of first candidate reference blocks for the first partition is reordered based on a width of a sample row of the first part of the top template being larger than a threshold value. The plurality of second candidate reference blocks for the second partition is reordered based on a width of a sample row of the second part of the top template being larger than the threshold value.

In an aspect, based on the left template being split into a first part and a second part, the first template region of the template samples including the top template and the first part of the left template, and the second template region of the template samples including the second part of the left template, the plurality of first candidate reference blocks for the first partition is ordered based on a number of samples in a sample column of the first part of the left template being larger than a threshold value. The plurality of second candidate reference blocks for the second partition is reordered based on a number of samples in a sample column of the second part of the left template being larger than the threshold value.

In an aspect, based on the left template being split by the partition line into a first part and a second part, the first template region of the template samples including the top template and the first part of the left template, and the second template region of the template samples including the second part of the left template, the plurality of first candidate reference blocks for the first partition is reordered based on a height of a sample column of the first part of the left template being larger than a threshold value. The plurality of second candidate reference blocks for the second partition is reordered based on a height of a sample column of the second part of the left template being larger than the threshold value.

In an aspect, based on the first template region of the template samples including one of the top template not split or the left template not split, and the second template region of the template samples including another one of the top template or the left template that is split, a TM difference between the one of the top template not split or the left template not split and a corresponding region of each of the first candidate templates is determined. The plurality of first candidate reference blocks for the first partition is further reordered based on an ascending order of the TM differences between the one of the top template not split or the left template not split and the corresponding regions of the first candidate templates.

In an example, a plurality of candidate partitions of the current block is determined based on a plurality of candidate partition manners. A plurality of candidate reference blocks is determined for each of the plurality of candidate partitions. A TM difference between the template samples of the current block and a template region of each of the plurality of candidate reference blocks of the plurality of candidate partitions is determined. The plurality of candidate reference blocks is reordered in an ascending order based on the TM differences between the template samples of the current block and the template regions of the plurality of candidate reference blocks of the current block.

In an example, the video bitstream includes a plurality of indices that indicate a subset of the plurality of reordered candidate reference blocks, where the subset of the plurality of reordered candidate reference blocks includes candidate reference blocks with first N smallest TM differences.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 8 shows a second example of template-matching based merge index reordering for GPM according to some embodiments of the disclosure.

FIG. 9 show a third example of template-matching based merge index reordering for GPM according to some embodiments of the disclosure.

DETAILED DESCRIPTION OF EMBODIMENTS

Figure 1:
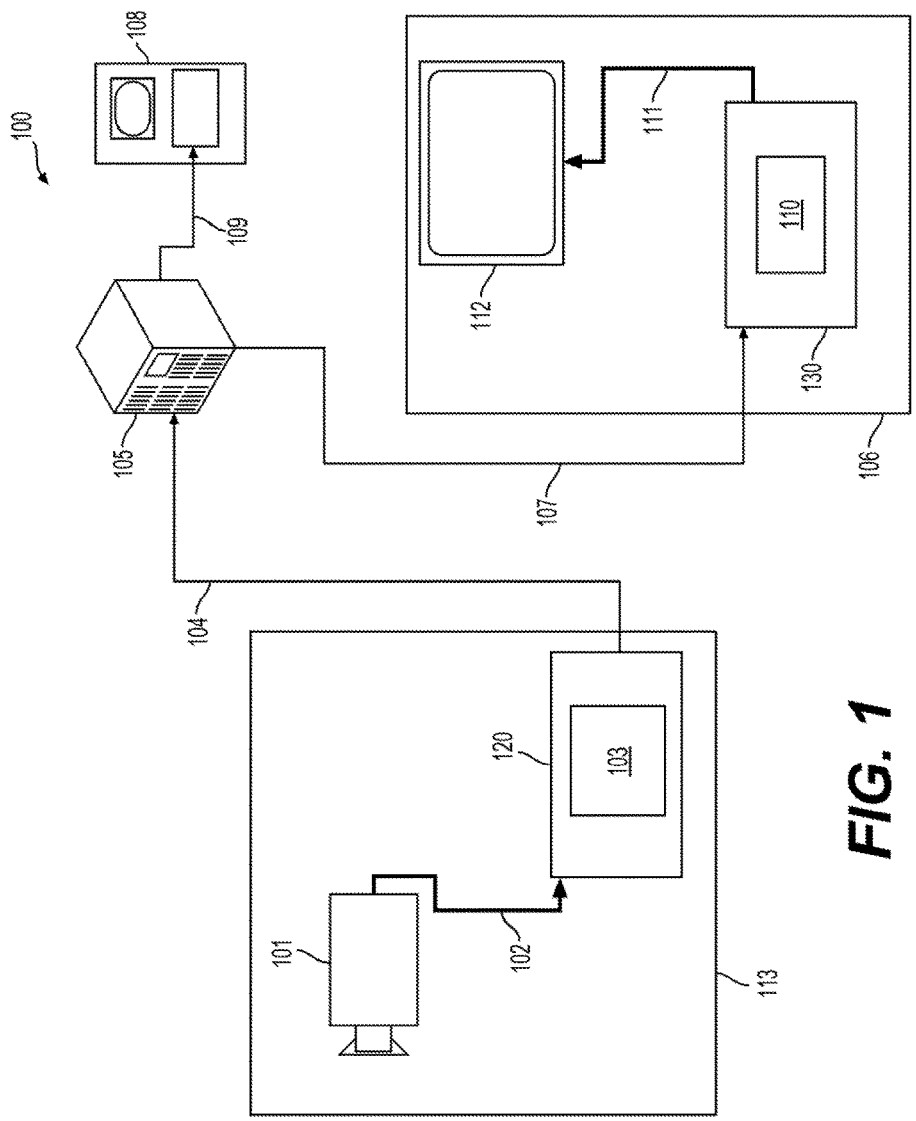
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
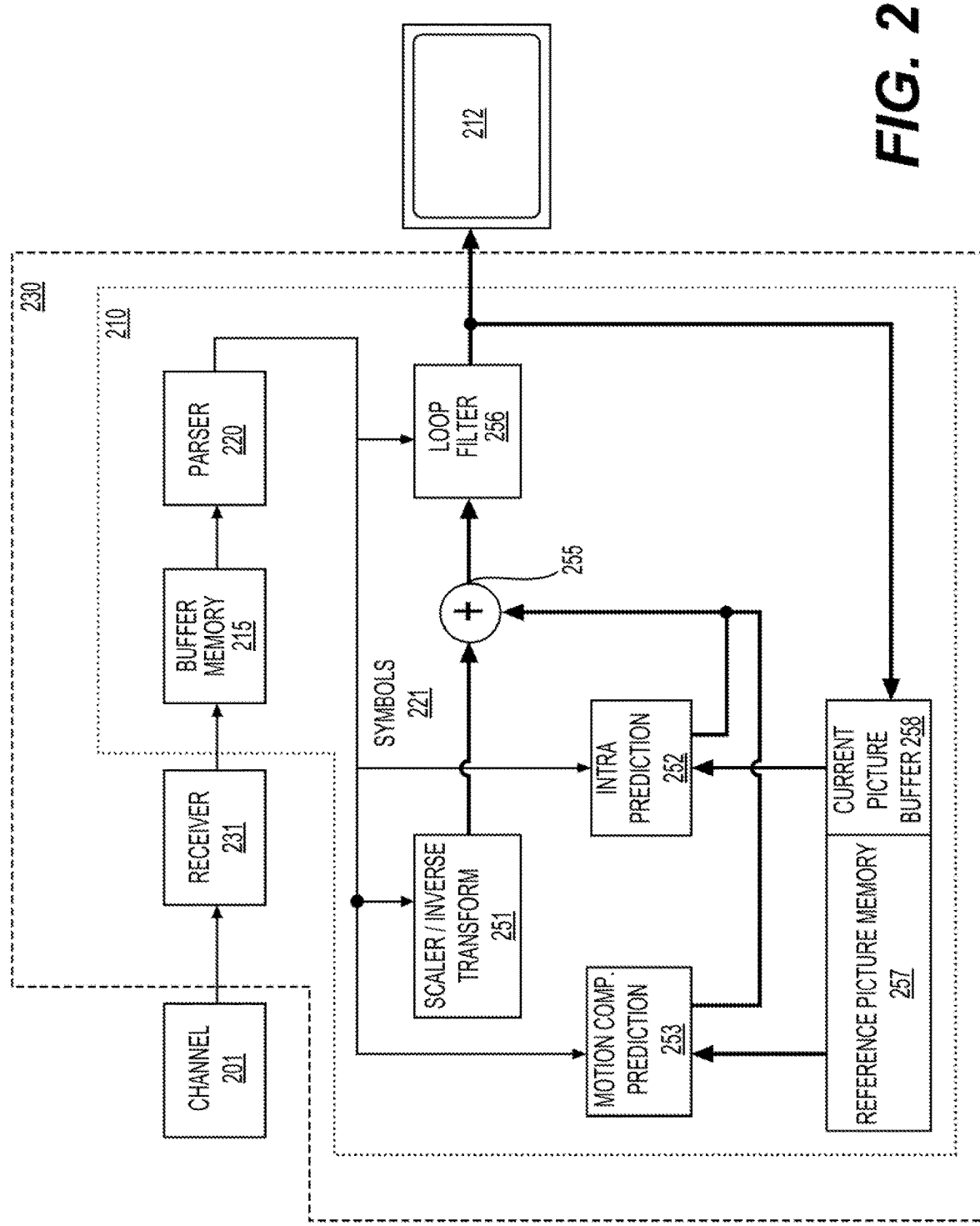
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
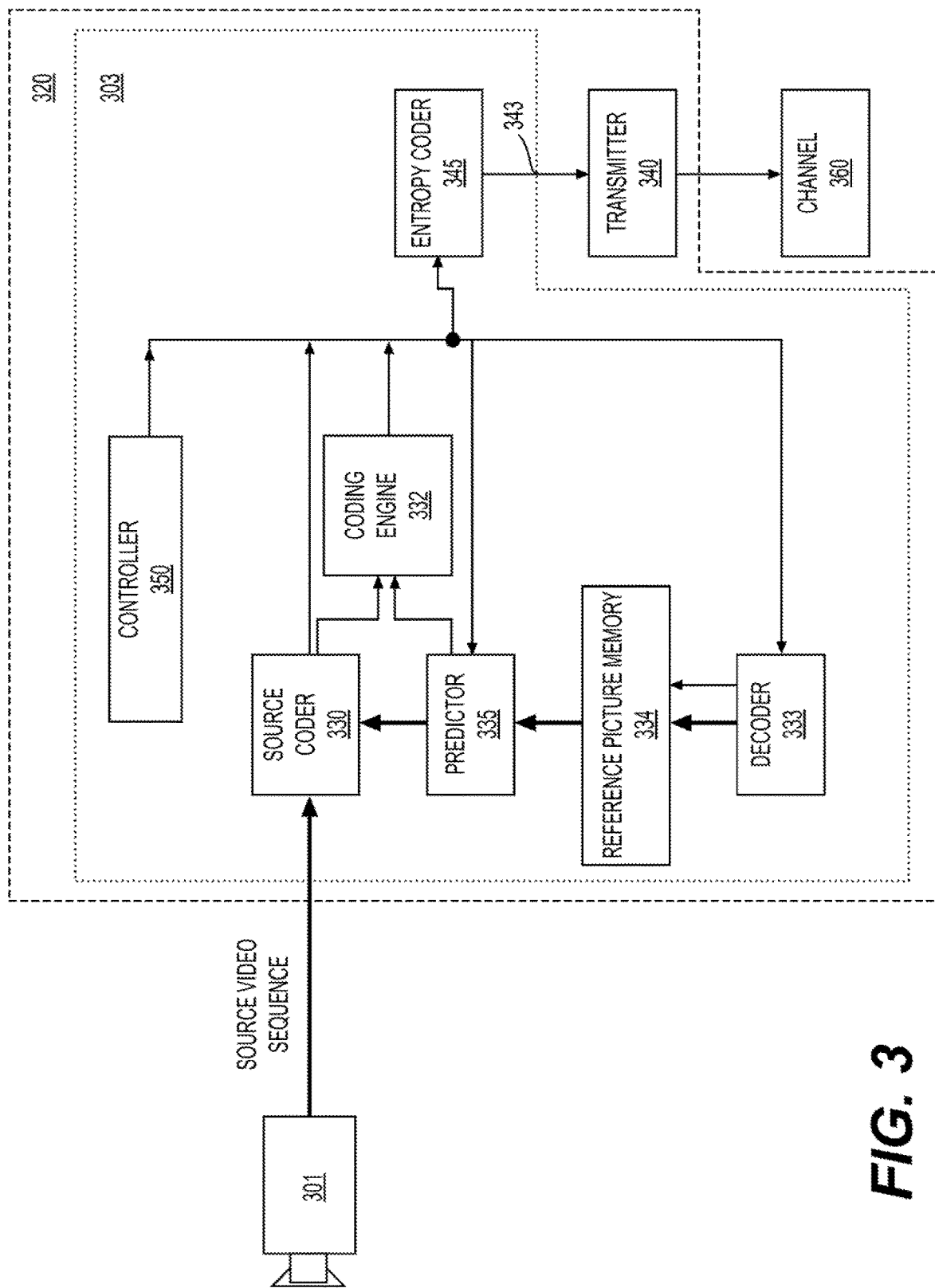
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity.

Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to reordering merge indices of merge MVs associated with partitions of geometric partition mode (GPM) based on a template matching process.

GPM, such as in VVC, can be applied for an inter prediction. The GPM may only be applied to CUs that are 8×8 or larger. The GPM can be signalled using a CU-level flag and treated as a merge mode. Other merge modes, such as in VVC, can include a regular merge mode, a merge motion vector difference (MMVD) mode, a combined inter and intra prediction (CIIP) mode, a subblock merge mode, or the like.

Figure 5:
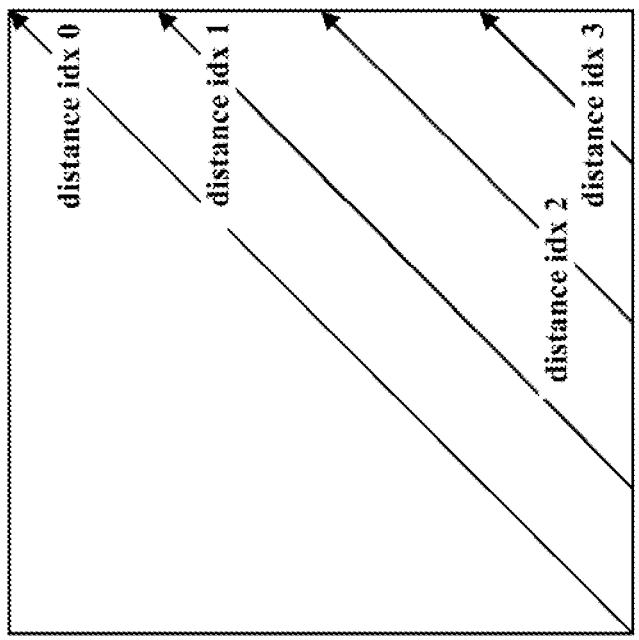
FIG. 5 shows exemplary candidate partition lines associated with a partition angle of the GPM.
Figure 4:
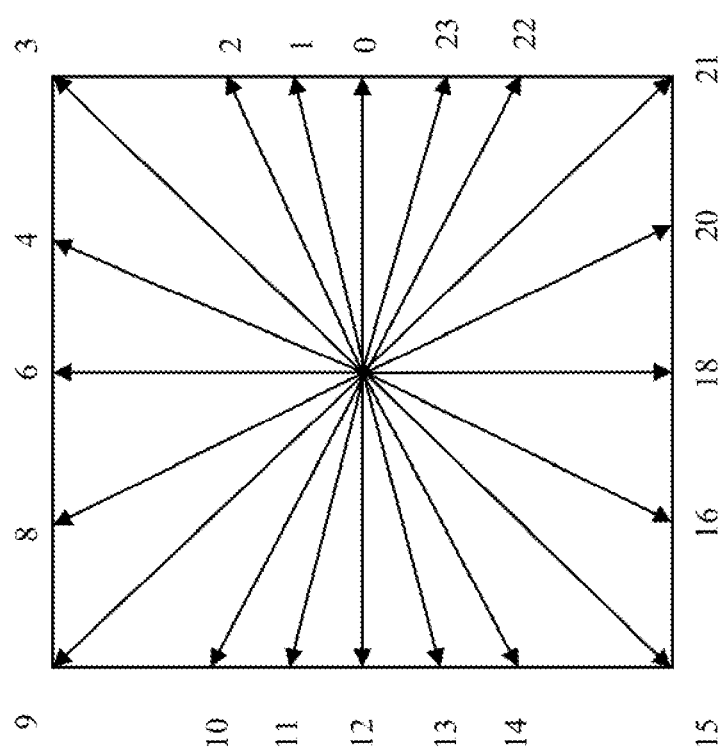
FIG. 4 shows exemplary a partition angle distribution of a geometric partition mode (GPM) inter prediction.

When the GPM mode is used, a CU can be split evenly into two geometric-shaped partitions by using one of 64 different partitioning manners, differentiated by 24 angles (e.g., non-uniformed quantized between 0 and 360°) and up to 4 edges relative to a center of a CU. FIG. 4 shows exemplary supported angles in VVC. FIG. 5 shows possible (or candidate) partition edges for an angle with an index 3. For example, 4 partition edges can be provided for the angle with the index 3. Each geometric partition in the CU can be inter-predicted using a respective motion. Uni-prediction may only be allowed for each partition, that is, each partition can have one motion vector and one reference index. The uni-prediction motion constraint can ensure that, like a conventional bi-prediction, only two motion compensated predictions are needed for each CU.

Figure 6:
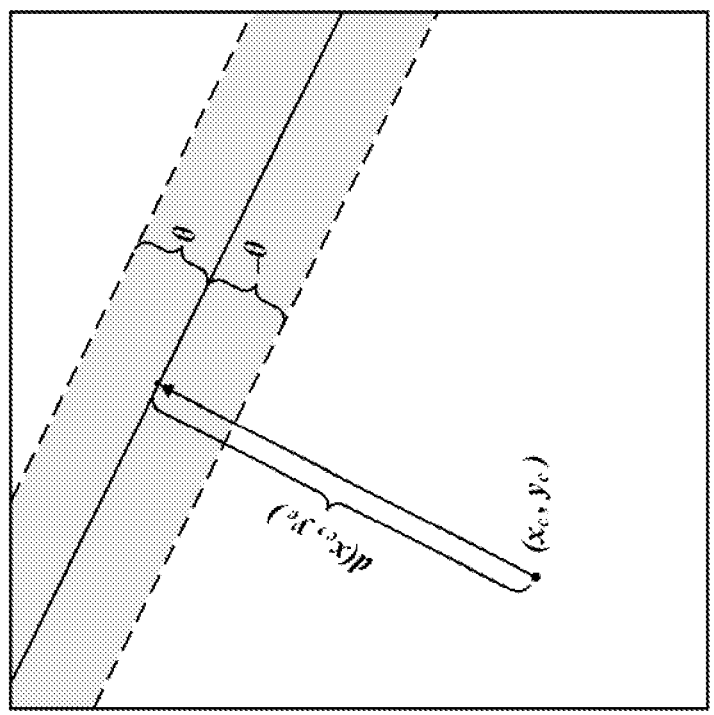
FIG. 6 is a schematic illustration of a blending process in a partition edge associated with the GPM.

If GPM is used for a current CU, then a signal indicating a geometric partition index, and two merge indices (one for each partition) can further be signalled. The number of a maximum GPM candidate size can be signalled explicitly at a slice level to specify syntax binarization for GPM merge indices. After each of the two geometric partitions is predicted, sample values along a geometric partition edge can further be adjusted using a blending processing with adaptive weights. A blending strength of GPM can be shown in FIG. 6. As shown in FIG. 6, the blending strength (or a blending area width) θ can be fixed for all different contents. Weighing values in a blending mask can be given by a ramp function in equation (1) as follows:

$$\omega_{x_c,y_c} = \begin{cases} 0 & d(x_c, y_c) \le -\theta \\ \frac{8}{2\theta}(d(x_c, y_c) + \theta) & -\theta < d(x_c, y_c) < \theta \\ 8 & d(x_c, y_c) \ge \theta \end{cases} \quad \text{Eq. (1)}$$

when θ=2 pel, such as in VVC, the ramp function shown in equation (1) can be quantized as follows in equation (2)

$$\omega_{m,n} = \text{Clip3}(0,8,(d(m,n)+32+4)>>3) \quad \text{Eq. (2)}$$

The blended results can be signaled for the whole CU as a prediction signal, and a transform and quantization process can further be applied to the whole CU as in other prediction modes. Further, a motion field of the CU that is predicted using the GPM can be stored.

Motion information of a CU, such as in VVC, can be stored in 4×4 unit. The stored motion information can be used for MV prediction and merge list construction for a next coded CU. In GPM, three types of motion information can be spanned and stored in a 4×4 unit. The stored motion information can include two geometric partitions, $P_0$ and $P_1$, and the unidirectional MVs of the two geometric partitions. The blending area between $P_0$ and $P_1$ can be predicted by the motion information from these two partitions. Therefore, the motion information of GPM can be stored according to the partitions.

The motion information of GPM can be signaled as a merge mode. In order to avoid an additional memory bandwidth access, uni-prediction may only be allowed for each partition in GPM. However, regular merge candidates may be a uni-prediction or a bi-prediction and cannot be directly used as a GPM merge list. In order to minimize the implementation complexity, an index parity-based method was proposed to directly extract the GPM merge candidates from the regular merge list without pruning. For example, for a candidate with an even value of the GPM merge index, MV0 from a reference list 0 with a corresponding regular merge index can be used as the GPM merge candidate. If MV0 is not available, MV1 from a reference list 1 can be used instead. Conversely, MV1 can be chosen as the default GPM merge candidate for an odd value of the GPM merge index.

In order to further improve the compression efficiency of VVC standard, JVET-U0100 and EE2 planned to be performed between $21^{st}$ and $22^{nd}$ JVET meetings to evaluate the enhanced compression tools beyond VVC capability. Template matching (TM) which refines a motion at a decoder side was proposed in JVET-U0100 and EE2. In TM mode, a motion can be refined by constructing a template from left and above neighboring reconstructed samples and finding a closest matching between the template in the current picture and a corresponding template in the reference frame.

In some embodiments, TM can be applied to GPM, such as in JVET-V117. When a CU is coded in GPM, each motion for the geometric partition can decide whether to be refined using TM or not. When TM is chosen, a template is constructed using left and above neighboring samples, and then the motion is refined by finding a best matching between the current template and a reference area with a same template pattern in the reference frame. The refined motion can be used to perform a motion compensation for the geometric partition and further be stored in the motion field.

Template-matching (TM), such as in ECM, can be used in GPM to reorder the GPM split mode according to TM costs of each GPM split mode. However, the signaled two merge indices in GPM may still be constructed in a fixed order. The signal cost of these two merge indices may be high.

In the disclosure, merge indices associated with partitions of GPM can be reordered based on TM costs of the merge indices according to a template matching process.

In an aspect, for a given geometric split mode, template matching cost of the available templates which are the reconstructed template above the current CU and/or on the left of the current CU is used, for all possible MVs from GPM merge candidates to reorder the candidate lists of the geometric partition by using TM cost in ascending order.

In an embodiment, for a given geometric split mode, template matching (TM) costs of available templates of a current CU can be applied for all possible MVs of GPM merge candidates to reorder candidate lists of the geometric partitions defined by the geometric split mode by using the TM costs in ascending order. The available templates of the current CU can be reconstructed templates above the current CU and/or on a left side of the current CU.

Figure 7:
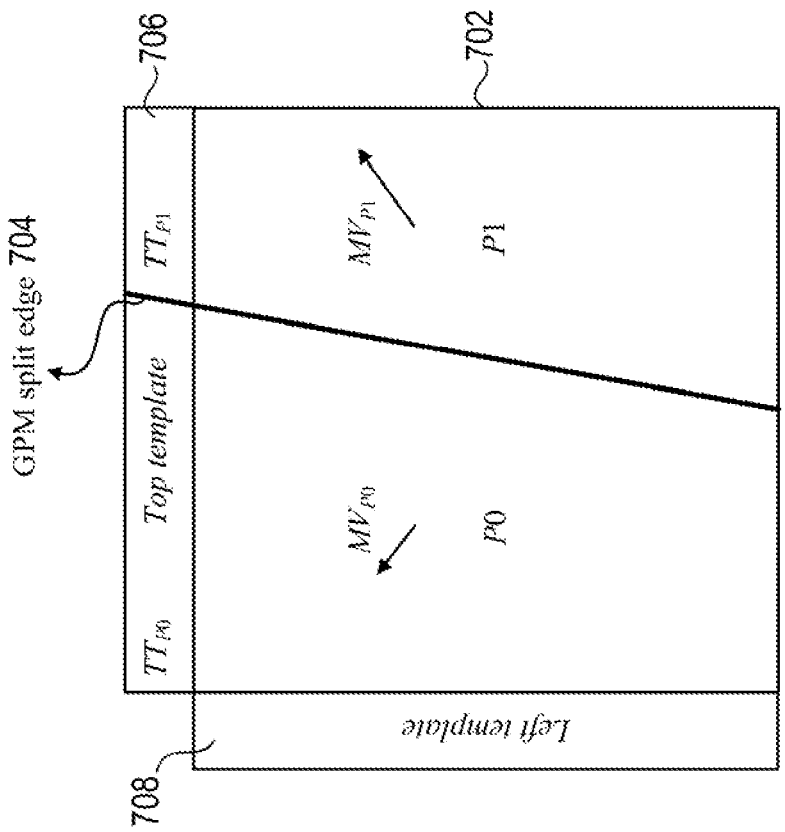
FIG. 7 shows a first example of template-matching based merge index reordering for GPM according to some embodiments of the disclosure.

In an aspect, as shown in FIG. 7, the top template may be split into two partitions $TT_{P0}$ and $TT_{P1}$. The $TT_{P0}$ and left template are used to reorder the merge index of the geometric partition P0 by using TM cost in ascending order, and the $TT_{P1}$ is used to reorder the merge index of partition P1.

In an example, as shown in FIG. 7, a current CU (702) can be partitioned into a first partition P0 and a second partition P1 according to a GPM split edge (or partition line) (704). The current CU (702) can have a top template (706) along a top side of the current CU (702) and a left template (708) along a left side of the current CU (702). The top template (706) may be split into two partitions $TT_{P0}$ (or a first part) and $TT_{P1}$ (or a second part) by the partition line (704). The $TT_{P0}$ and left template (708) can be used as a first template region to reorder the merge index of the geometric partition P0 by using TM cost in an ascending order, and the $TT_{P1}$ can be used as a second template region to reorder the merge index of partition P1. The merge indices of the partition P0 can indicate candidate MVs of the partition $P_0$. Each of the candidate MVs of the partition P0 can indicate a respective first candidate reference block for the partition $P_0$. The merge indices of the partition P1 can indicate candidate MVs of the partition P1. Each of the candidate MVs of the partition P1 can indicate a respective first candidate reference block for the partition P1. Each merge index can correspond to a candidate MV (or candidate reference block). Based on the TM costs, the candidate MVs (or candidate reference blocks) can be reordered. For example, based on the TM costs (or TM differences) between the $TT_{P0}$ and left template (708) and corresponding templates of the candidate reference blocks for the partition $P_0$, the candidate MVs (or candidate reference blocks) of the partition P0 can be reordered.

In an aspect, all MVs from reference list 0 and reference list 1 in regular merge candidates may be used as MV for the geometric partition for merge index reordering. All MVs are sorted by using TM costs in ascending order and only N candidates with smallest TM costs are used and signaled in GPM merge list with merge index reordering by using TM cost in ascending order.

In an example, MVs from a reference list 0 (L0) and/or a reference list 1 (L1) in regular merge candidates may be used as MVs for the geometric partitions for merge index reordering. The MVs from the L0 and/or L1 can be sorted by using TM costs in in an order, such as an ascending order. The TM costs can indicate the differences between the templates of the GPM partitions and the templates of the MVs corresponding to the GPM partitions. In an example, only N candidates with smallest TM costs may be used and signaled in a GPM merge list with the reordered merge index by using TM cost in the ascending order.

In an aspect, the MVs from non-adjacent blocks and temporal motion vector from collocated reference frames could be used as MV for the merge candidate list reordering of GPM. In an example, MVs from non-adjacent blocks and/or temporal motion vectors from collocated reference frames can be used as MVs for the merge candidate list reordering of the GPM.

In an aspect, the template matching based reordering method, such as adaptive reordering of merge candidates with template matching (ARMC-TM), may be applied on a merge candidate list first, and the GPM candidate derivation process may be done based on the reordered merge candidate list.

In an embodiment, the template matching based reordering can be applied on a merge candidate list first, and the derivation of the GPM candidate can be performed based on the reordered merge candidate list.

In an aspect, the GPM merge candidate list construction for one partition (for example, P0) may be based on the reordered merge candidate list, and the other partition (for example, P1) may still use the candidate list before the TM based reordering.

In an example, construction of the GPM merge candidate list for one partition (e.g., P0) can be performed based on the reordered merge candidate list and the other partition (e.g., P1) may still use a candidate list without the TM based reordering.

In an aspect, for a given geometric split mode, merge index reordering by using template-matching for the geometric partition is not allowed when its corresponding template size is smaller than a threshold value S, and this threshold value, S, is a non-negative value. FIGS. 8 and 9 show two examples that template-matching cannot be applied on the template for geometric partition P1 when the threshold value S is 4. In FIGS. 8-9, each square in the template stands for a pixel unit.

In an embodiment, for a given geometric split mode, merge index reordering by using template-matching may not be allowed for a geometric partition when a template size of a template of the geometric partition is smaller than a threshold value S. The threshold value, S, can be a non-negative value, such as 0 or other positive integers (e.g., 4).

The constraint of the merge index reordering by using TM can be shows in FIGS. 8 and 9, for example. FIGS. 8 and 9 show two examples that template-matching cannot be applied on the template for the geometric partition P1 when the threshold value S is 4. In FIGS. 8 and 9, each square in the template can stand for a pixel unit.

As shown in FIG. 8, a current CU (802) can include a top template (806) and a left template (808). The current CU (802) can be portioned into a first partition P0 and a second partition P1 by a GPM split edge (or partition line) (804). The top template (806) can also be partitioned into a first part (806A) and (806B). The first part (806A) of the top template (806) and the left template (808) can function as a template (or first template region) for the first partition P0 and the second part (806B) of the top template (806) can function as a template (or second template region) for the second partition P1. As the size of the second part (806B) is smaller than the threshold value, such as 4, the template-matching may not be applied to the template for the geometric partition P1.

As shown in FIG. 9, a current CU (902) can include a top template (906) and a left template (908). The current CU (902) can be portioned into a first partition P0 and a second partition P1 by a GPM split edge (or partition line) (904). The left template (908) can also be partitioned into a first part (908A) and (908B). The first part (908A) and the top template (906) can function as a template (or first template region) for the first partition P0 and the second part (908B) can function as a template (or second template region) for the second partition P1. As the size of the second part (908B) is smaller than the threshold value, such as 4, the template-matching may not be applied to the template for the geometric partition P1.

In as aspect, the template size for the given geometric split mode means the total number of samples within the corresponding template size of the geometric partition. In an aspect, the template size for the given geometric split mode means the width or height of the corresponding top template or left template no matter how many lines in top template or columns in left template.

In an example, the template size can indicate a total number of samples within the corresponding template of the geometric partition. For example, as shown in FIG. 8, the first part (806A) of the top template (806) can have a template size between 7 and 8, and the second part (806A) of the top template (806) can have a template size less than 1.

In an example, the template size can indicate a width or a height of the corresponding top template (e.g., (806)) or left template (e.g., (808)) no matter how many lines (or rows) in the top template or columns in the left template. For example, as shown in FIG. 8, a width of the first part (806A) of the top template (806) can indicate the template size of the first part (806A). In FIG. 9, a height of the first part (908A) of the left template (908) can indicate the template size of the first part (908A).

In an aspect, the template-matching is not allowed when one or more of the following conditions are true:
(1) The size of inner line in a top template or inner column in a left template for the corresponding geometric partition is smaller than and/or equal to the threshold value.
(2) The size of one of the lines in a top template or one of the columns in a left template for the corresponding geometric partition is smaller than and/or equal to the threshold value.
(3) The size for all lines in a top template or all columns in a left template for the corresponding geometric partition is smaller than and/or equal to the threshold value.

In an example, the template-matching may not be allowed when one or more of the following conditions are true: (1) The size of an inner line (or inner row) in a top template or an inner column in a left template for the corresponding geometric partition is smaller than and/or equal to the threshold value. (2) The size of one of the lines (or rows) in a top template or one of the columns in a left template for the corresponding geometric partition is smaller than and/or equal to the threshold value. (3) The size for all lines (rows) in a top template or all columns in a left template for the corresponding geometric partition is smaller than and/or equal to the threshold value.

In an aspect, the GPM merge list construction may be applied only for the partition which has at least one template with a complete size of block width or height (not affected by the GPM partition split), and only the complete template would be used for template matching based candidate reordering for the corresponding partition. In an aspect, when a partition does not have a complete adjacent template, the corresponding GPM candidate list may not be reordered.

In an example, the GPM merge list construction may be applied only for the partition which has at least one template with a complete size. Thus, a width or a height of the temple is complete and not affected (or split) by the GPM partition split. Accordingly, only the complete template would be used for template matching based candidate reordering for the corresponding partition.

In an example, when a partition does not have a complete adjacent template, the GPM candidate list corresponding to the partition may not be reordered.

In an aspect, the GPM merge list construction for the geometric partition in which the template-matching cannot be applied remains the same as the GPM merge list construction in VVC or current ECM software.

In an example, when the GPM merge list construction for the geometric partition in which the template-matching cannot be applied, the GPM merge list construction remains the same as the GPM merge list construction in a related codec (or software), such as VVC or ECM software.

In an aspect, the template-matching is applied to all possible combinations of geometric split mode and two (or one, or more) merge indices for two (or one, or more) geometric partitions, and then the index that indicates which geometric split mode and motion vectors from GPM merge list are used reordered based on the template-matching cost in ascending order.

In an embodiment, the template-matching can be applied to all possible combinations of (i) geometric split modes and (ii) two (or one, or more) merge indices for two (or one, or more) geometric partitions determined by the geometric split modes. For example, the GPM can have 64 split modes, each split mode can have two geometric partitions, and each geometric partition can have N merge indices. Thus, the combination of the merge indices can be equal to 64×2×N. Each of the merge indices can further correspond to a respective merge candidate (or reference block). The merge indices can be reordered based on the template-matching cost in a pre-defined order (e.g., an ascending order) and indicate which geometric split mode and motion vectors (indicated by the merge indices) from the GPM merge list can be used.

In an aspect, the GPM merge candidates could be but are not limited to regular merge candidates, non-adjacent candidates, TMVP, etc. In an example, the GPM merge candidates can be but not limited to regular merge candidates, non-adjacent candidates, temporal motion vector prediction (TMVP) candidates, or the like.

In an aspect, only n indices with smallest TM cost are selected. n is a nonzero value and is smaller than the number of all possible combinations of geometric split mode and two merge indices for two geometric partitions. In an aspect, the value of n can be signaled in high-level syntax such as VPS, SPS, PPS, slice header. In an example, an index is signaled to indicate which of the n indices is used for reconstructing the current block.

In an aspect, instead of signaling both GPM merge index and GPM split mode, only one GPM index is signaled, however, this signaled GPM index includes information about which GPM merge candidate is used for each of the GPM partitions, and which GPM split mode is used for the current block. In an example, instead of signaling both a GPM merge index and a GPM split mode, one GPM index can be signaled.

Figure 10:
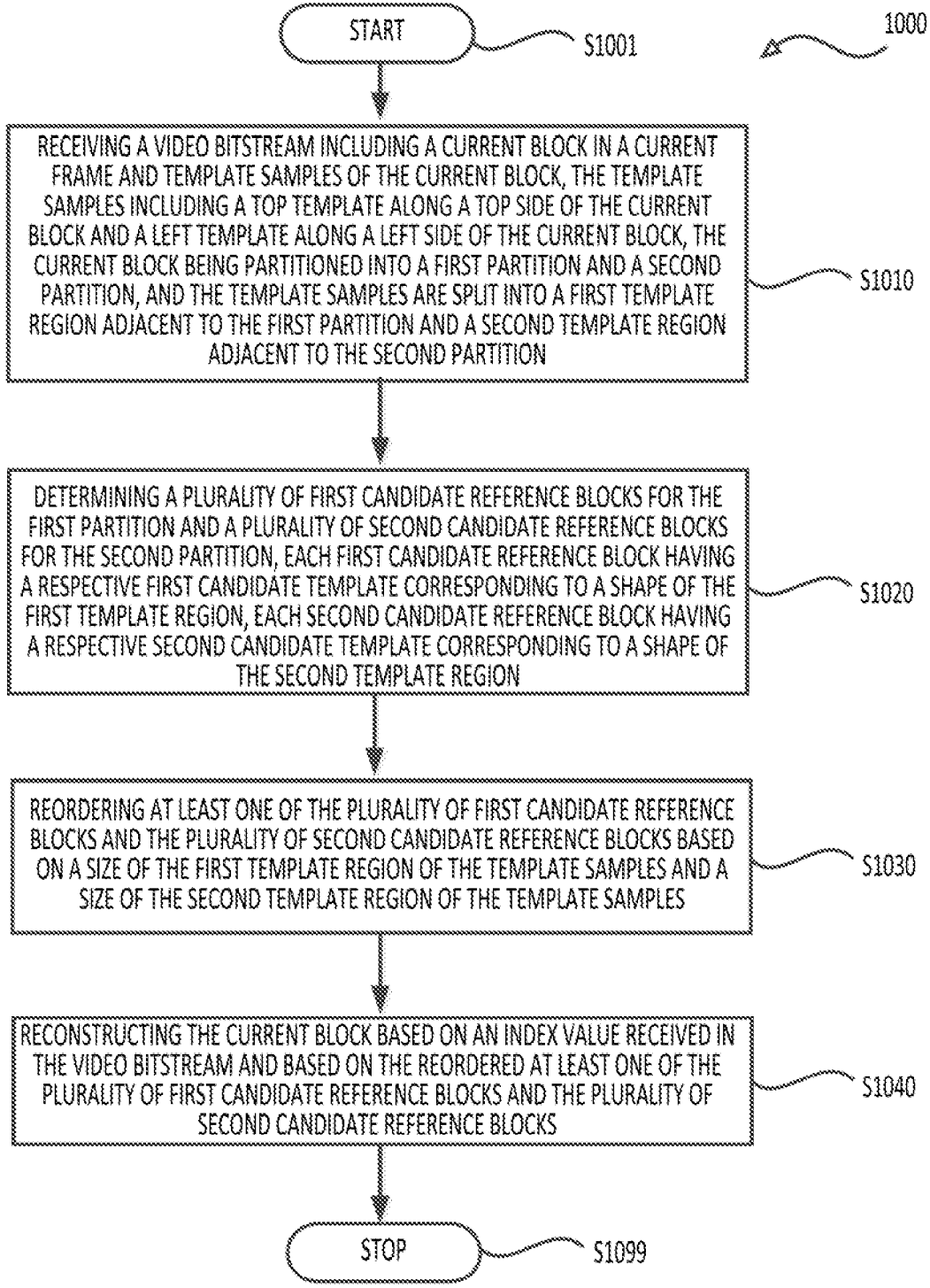
FIG. 10 shows a flow chart outlining a decoding process according to some embodiments of the disclosure.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a video bitstream including a current block in a current frame and template samples of the current block is received. The template samples include a top template along a top side of the current block and a left template along a left side of the current block. The current block is partitioned into a first partition and a second partition, and the template samples are split into a first template region adjacent to the first partition and a second template region adjacent to the second partition.

For example, for a given geometric split mode, template matching costs of the available templates which are the reconstructed template above the current CU (for example, a top template) and/or on the left of the current CU (for example, a left template), are used for all possible MVs from GPM merge candidates to reorder the candidate lists of the geometric partition by using TM cost in ascending order. Further, as shown in FIG. 7, the top template may be split into two partitions $TT_{P0}$ and $TT_{P1}$. The $TT_{P0}$ and left template are used as a first template region to reorder the merge index of the geometric partition P0 by using TM cost in ascending order, and the $TT_{P1}$ is used as a second template region to reorder the merge index of partition P1.

At (S1020), a plurality of first candidate reference blocks is determined for the first partition and a plurality of second candidate reference blocks is determined for the second partition. Each first candidate reference block has a respective first candidate template corresponding to a shape of the first template region, and each second candidate reference block has a respective second candidate template corresponding to a shape of the second template region.

For example, all MVs from reference list 0 and/or reference list 1 in regular merge candidates may be used as an MV for the geometric partition for merge index reordering. All MVs are sorted by using TM costs in ascending order and only N candidates with smallest TM costs are used and signaled in GPM merge list with merge index reordering by using TM cost in ascending order. MVs from a reference list 0 (L0) and/or a reference list 1 (L1) in regular merge candidates may be used as MVs for the geometric partitions for merge index reordering. The MVs from the L0 and/or L1 can be sorted by using TM costs in in an order, such as an ascending order. The TM costs can indicate the differences between the templates of the GPM partitions and the templates of the MVs corresponding to the GPM partitions.

At (S1030), at least one of the plurality of first candidate reference blocks and the plurality of second candidate reference blocks is reordered based on a size of the first template region of the template samples and a size of the second template region of the template samples.

In example, for a given geometric split mode, merge index reordering by using template-matching for the geometric partition is not allowed when its corresponding template (for example, template region) size is smaller than a threshold value S, and this threshold value, S, is a non-negative value. FIGS. 8 and 9 show two examples that template-matching cannot be applied on the template for geometric partition P1 when the threshold value S is 4. In FIGS. 8-9, each square in the template stands for a pixel unit. For example, as shown in FIG. 8, the current CU (802) can be partitioned into a first partition P0 and a second partition P1 by a GPM split edge (or partition line) (804). The top template (806) can also be partitioned into a first part (806A) and (806B). The first part (806A) of the top template (806) and the left template (808) can correspond to a first template region for the first partition P0 and the second part (806B) of the top template (806) can correspond to a second template region for the second partition P1. As the size of the second part (806B) is smaller than the threshold value, such as 4, the template-matching may not be applied to the template for the geometric partition P1.

At (S1040), the current block is reconstructed based on an index value received in the video bitstream and based on the reordered at least one of the plurality of first candidate reference blocks and the plurality of second candidate reference blocks. In an example, all MVs are sorted by using TM costs in ascending order and only N candidates with the smallest TM costs are used and signaled in GPM merge list with merge index (for example, indicating an index value) reordering by using TM cost in ascending order. In an example, instead of signaling both a GPM merge index and a GPM split mode, one GPM index can be signaled. The signaled one GPM index can include information about which GPM merge candidate is used for each of the GPM partitions, and which GPM split mode is used for the current block.

In an example, the plurality of first candidate reference blocks for the first partition of the current block and the plurality of second candidate reference blocks for the second partition of the current block are determined based on candidate reference blocks indicated by motion vectors (MVs) in a first reference list and in a second reference list.

In an example, the plurality of first candidate reference blocks for the first partition of the current block and the plurality of second candidate reference blocks for the second partition of the current block are determined based on one of non-adjacent blocks and blocks in collocated reference frames of the current frame indicated by temporal motion vectors.

In an aspect, a template-matching (TM) difference between the first template region of the template samples and each of the first candidate templates is determined. A TM difference between the second template region of the template samples and each of the second candidate templates is determined. The plurality of first candidate reference blocks for the first partition is reordered based on an ascending order of the TM differences between the first template region of the template samples and the first candidate templates. The plurality of second candidate reference blocks for the second partition is reordered based on an ascending order of the TM differences between the second template region of the template samples and the second candidate templates.

In an aspect, based on the top template being split into a first part and a second part, the first template region of the template samples including the left template and the first part of the top template, and the second template region of the template samples including the second part of the top template, the plurality of first candidate reference blocks for the first partition is reordered based on a number of samples in a sample row of the first part of the top template being larger than a threshold value. The plurality of second candidate reference blocks for the second partition is reordered based on a number of samples in a sample row of the second part of the top template being larger than the threshold value.

In an aspect, based on the top template being split into a first part and a second part, the first template region of the template samples including the left template and the first part of the top template, and the second template region of the template samples including the second part of the top template, the plurality of first candidate reference blocks for the first partition is reordered based on a width of a sample row of the first part of the top template being larger than a threshold value. The plurality of second candidate reference blocks for the second partition is reordered based on a width of a sample row of the second part of the top template being larger than the threshold value.

In an aspect, based on the left template being split into a first part and a second part, the first template region of the template samples including the top template and the first part of the left template, and the second template region of the template samples including the second part of the left template, the plurality of first candidate reference blocks for the first partition is ordered based on a number of samples in a sample column of the first part of the left template being larger than a threshold value. The plurality of second candidate reference blocks for the second partition is reordered based on a number of samples in a sample column of the second part of the left template being larger than the threshold value.

In an aspect, based on the left template being split by the partition line into a first part and a second part, the first template region of the template samples including the top template and the first part of the left template, and the second template region of the template samples including the second part of the left template, the plurality of first candidate reference blocks for the first partition is reordered based on a height of a sample column of the first part of the left template being larger than a threshold value. The plurality of second candidate reference blocks for the second partition is reordered based on a height of a sample column of the second part of the left template being larger than the threshold value.

In an aspect, based on the first template region of the template samples including one of the top template not split or the left template not split, and the second template region of the template samples including another one of the top template or the left template that is split, a TM difference between the one of the top template not split or the left template not split and a corresponding region of each of the first candidate templates is determined. The plurality of first candidate reference blocks for the first partition is further reordered based on an ascending order of the TM differences between the one of the top template not split or the left template not split and the corresponding regions of the first candidate templates.

In an example, a plurality of candidate partitions of the current block is determined based on a plurality of candidate partition manners. A plurality of candidate reference blocks is determined for each of the plurality of candidate partitions. A TM difference between the template samples of the current block and a template region of each of the plurality of candidate reference blocks of the plurality of candidate partitions is determined. The plurality of candidate reference blocks is reordered in an ascending order based on the TM differences between the template samples of the current block and the template regions of the plurality of candidate reference blocks of the current block.

In an example, the video bitstream includes a plurality of indices that indicate a subset of the plurality of reordered candidate reference blocks, where the subset of the plurality of reordered candidate reference blocks includes candidate reference blocks with first N smallest TM differences.

Then, the process proceeds to (S1099) and terminates.

The process (1000) can be suitably adapted. Step(s) in the process (1000) can be modified and/or omitted. Additional step(s) can be added. Any suitable order of implementation can be used.

Figure 11:
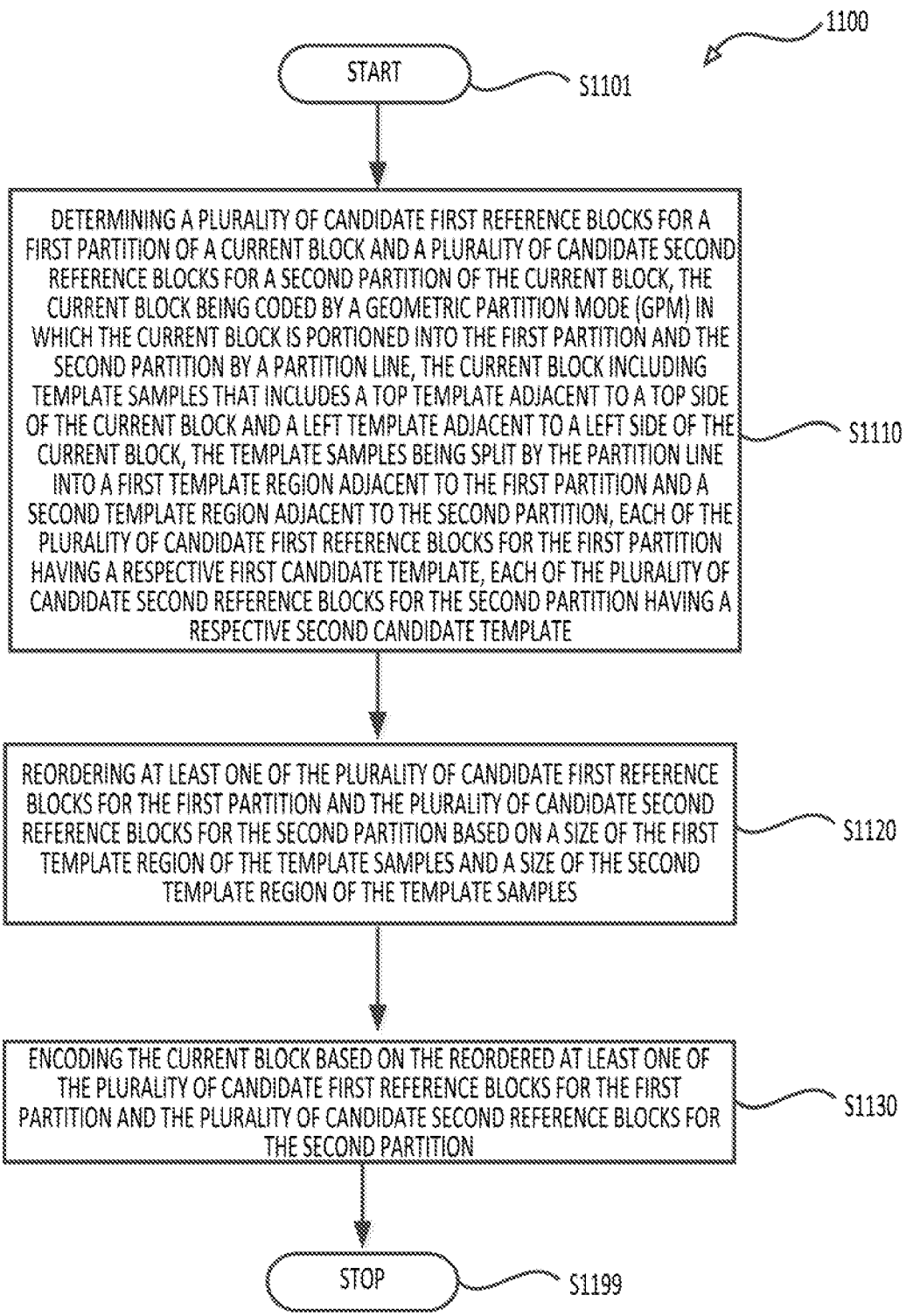
FIG. 11 shows a flow chart outlining an encoding process according to some embodiments of the disclosure.

FIG. 11 shows a flow chart outlining a process (1100) according to an embodiment of the disclosure. The process (1100) can be used in a video encoder. In various embodiments, the process (1100) is executed by processing circuitry, such as the processing circuitry that performs functions of the video encoder (103), the processing circuitry that performs functions of the video encoder (303), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a plurality of candidate first reference blocks is determined for a first partition of a current block and a plurality of candidate second reference blocks is determined for a second partition of the current block. The current block is coded by a geometric partition mode (GPM) in which the current block is portioned into the first partition and the second partition by a partition line. The current block includes template samples that includes a top template adjacent to a top side of the current block and a left template adjacent to a left side of the current block. The template samples are split by the partition line into a first template region adjacent to the first partition and a second template region adjacent to the second partition. Each of the plurality of candidate first reference blocks for the first partition has a respective first candidate template. Each of the plurality of candidate second reference blocks for the second partition has a respective second candidate template.

An exemplary embodiment associated with step (S1110) can be shown in FIG. 7. As shown in FIG. 7, a current CU (702) can be partition into a first partition P0 and a second partition P1 according to a GPM split edge (or partition line) (704). The current CU (702) can have a top template (706) over a top side of the current CU (702) and a left template (708) on a left side of the current CU (702). The top template (706) may be split into two partitions $TT_{P0}$ and $TT_{P1}$ by the partition line (704). The $TT_{P0}$ and left template (708) can be used to reorder the merge index of the geometric partition P0 by using TM cost in an ascending order, and the $TT_{P1}$ can be used to reorder the merge index of partition P1.

At (S1120), at least one of the plurality of candidate first reference blocks for the first partition and the plurality of candidate second reference blocks for the second partition are reordered based on a size of the first template region of the template samples and a size of the second template region of the template samples.

For example, as shown in FIG. 8, the current CU (802) can be portioned into a first partition P0 and a second partition P1 by a GPM split edge (or partition line) (804). The top template (806) can also be partitioned into a first part (806A) and (806B). The first part (806A) of the top template (806) and the left template (808) can function as a template for the first partition P0 and the second part (806B) of the top template (806) can function as a template for the second partition P1. As the size of the second part (806B) is smaller than the threshold value, such as 4, the template-matching may not be applied to the template for the geometric partition P1.

At (S1130), the current block is encoded based on the reordered at least one of the plurality of candidate first reference blocks for the first partition and the plurality of candidate second reference blocks for the second partition. In an example, only n indices with smallest TM costs may be selected. n can be a nonzero value and smaller than the number of all possible combinations of geometric split modes and two merge indices for two geometric partitions. In an example, the value of n can be signaled in a high-level syntax such as VPS, SPS, PPS, slice header. In an example. An index can be signaled to indicate which of the n indices is used for reconstructing the current block.

Then, the process proceeds to (S1199) and terminates.

The process (1100) can be suitably adapted. Step(s) in the process (1100) can be modified and/or omitted. Additional step(s) can be added. Any suitable order of implementation can be used.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
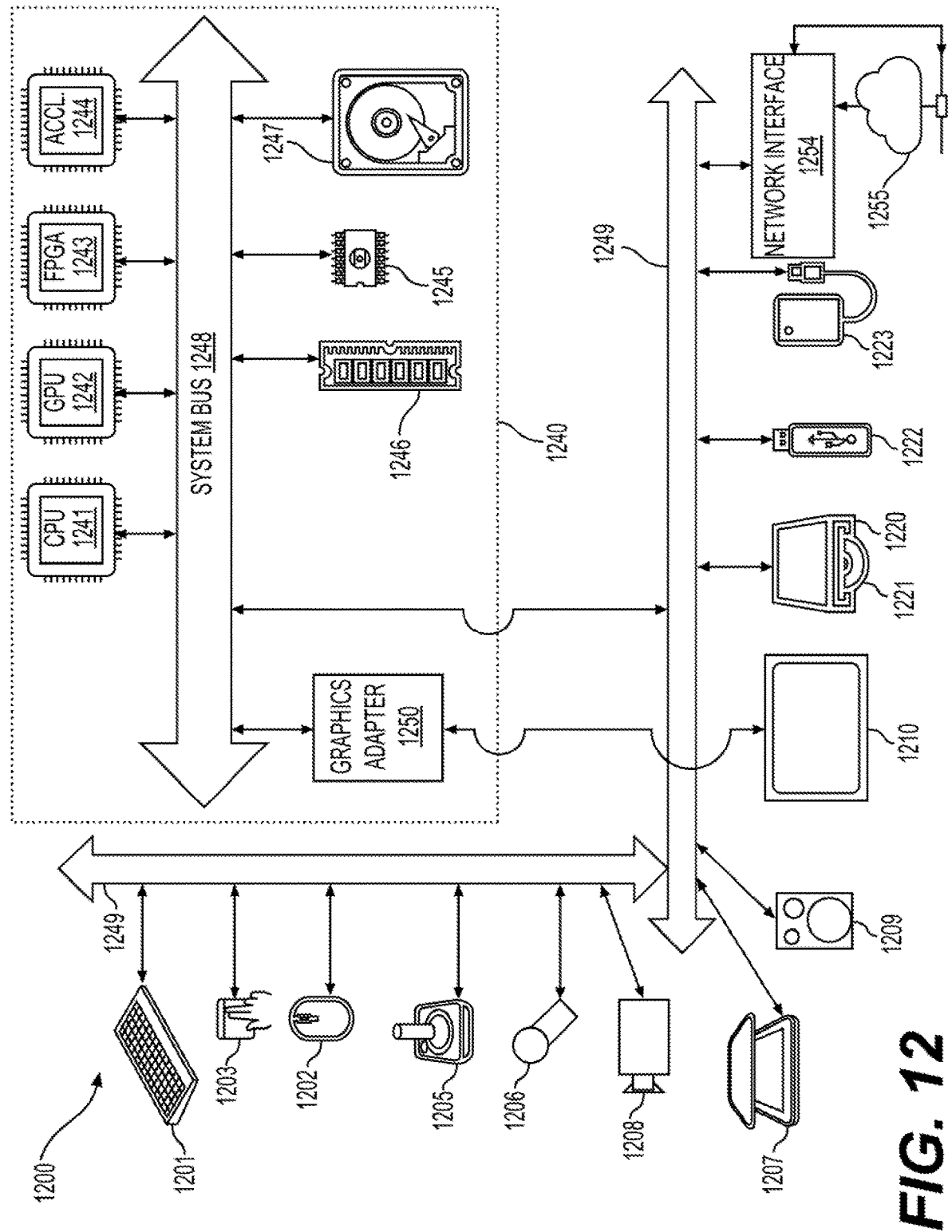
FIG. 12 is a schematic illustration of an exemplary computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
    receiving a video bitstream including coded information of a current block in a current frame and template samples of the current block, the template samples including a top template along a top side of the current block and a left template along a left side of the current block, the current block being partitioned into a first partition and a second partition via a split edge, and the template samples being split via the split edge into a first template region adjacent to the first partition and a second template region adjacent to the second partition such that one of the top template and the left template is split by the split edge;
    determining a plurality of first candidate reference blocks for the first partition and a plurality of second candidate reference blocks for the second partition, each first candidate reference block having a respective first candidate template corresponding to a shape of the first template region, each second candidate reference block having a respective second candidate template corresponding to a shape of the second template region;
    reordering at least one of the plurality of first candidate reference blocks and the plurality of second candidate reference blocks when a size of a template region of the one of the top template and the left template defined by the split edge is larger than a threshold value; and reconstructing the current block based on an index value received in the video bitstream and based on the reordered at least one of the plurality of first candidate reference blocks and the plurality of second candidate reference blocks.

2. The method of claim 1, wherein the determining further comprises:

determining the plurality of first candidate reference blocks for the first partition of the current block and the plurality of second candidate reference blocks for the second partition of the current block based on candidate reference blocks indicated by motion vectors (MVs) in a first reference list and in a second reference list.

3. The method of claim 1, wherein the determining further comprises:

determining the plurality of first candidate reference blocks for the first partition of the current block and the plurality of second candidate reference blocks for the second partition of the current block based on one of non-adjacent blocks and blocks in collocated reference frames of the current frame indicated by temporal motion vectors.

4. The method of claim 1, wherein the reordering further comprises:

determining a template-matching (TM) difference between the first template region of the template samples and each of the first candidate templates and a TM difference between the second template region of the template samples and each of the second candidate templates; and reordering (i) the plurality of first candidate reference blocks for the first partition based on an ascending order of the TM differences between the first template region of the template samples and the first candidate templates and (ii) the plurality of second candidate reference blocks for the second partition based on an ascending order of the TM differences between the second template region of the template samples and the second candidate templates.

5. The method of claim 1, wherein the reordering further comprises:

when the top template is split into a first part and a second part, the first template region of the template samples includes the left template and the first part of the top template, and the second template region of the template samples includes the second part of the top template, reordering the plurality of first candidate reference blocks for the first partition when a number of samples in a sample row of the first part of the top template is larger than the threshold value; and reordering the plurality of second candidate reference blocks for the second partition when a number of samples in a sample row of the second part of the top template is larger than the threshold value.

6. The method of claim 1, wherein the reordering further comprises:

when the top template is split into a first part and a second part, the first template region of the template samples includes the left template and the first part of the top template, and the second template region of the template samples includes the second part of the top template, reordering the plurality of first candidate reference blocks for the first partition when a width of a sample row of the first part of the top template is larger than the threshold value; and reordering the plurality of second candidate reference blocks for the second partition when a width of a sample row of the second part of the top template is larger than the threshold value.

7. The method of claim 1, wherein the reordering further comprises:

when the left template is split into a first part and a second part, the first template region of the template samples includes the top template and the first part of the left template, and the second template region of the template samples includes the second part of the left template, reordering the plurality of first candidate reference blocks for the first partition when a number of samples in a sample column of the first part of the left template is larger than the threshold value; and reordering the plurality of second candidate reference blocks for the second partition when a number of samples in a sample column of the second part of the left template is larger than the threshold value.

8. The method of claim 1, wherein the reordering further comprises:

when the left template is split into a first part and a second part, the first template region of the template samples includes the top template and the first part of the left template, and the second template region of the template samples includes the second part of the left template, reordering the plurality of first candidate reference blocks for the first partition when a height of a sample column of the first part of the left template is larger than the threshold value; and reordering the plurality of second candidate reference blocks for the second partition when a height of a sample column of the second part of the left template is larger than the threshold value.

9. The method of claim 1, wherein the reordering further comprises:

when the first template region of the template samples includes one of the top template not split or the left template not split, and the second template region of the template samples includes another one of the top template or the left template that is split, determining a template-matching (TM) difference between the one of the top template not split or the left template not split and a corresponding region of each of the first candidate templates; and reordering the plurality of first candidate reference blocks for the first partition based on an ascending order of the TM differences between the one of the top template not split e or the left template not split and the corresponding regions of the first candidate templates.

10. The method of claim 4, further comprising:

determining a plurality of candidate partitions of the current block based on a plurality of candidate partition manners;

determining a plurality of candidate reference blocks for each of the plurality of candidate partitions;

determining a TM difference between the template samples of the current block and a template region of each of the plurality of candidate reference blocks of the plurality of candidate partitions; and reordering the plurality of candidate reference blocks in an ascending order based on the TM differences between the template samples of the current block and the template regions of the plurality of candidate reference blocks of the current block.

11. The method of claim 10, wherein the video bitstream includes a plurality of indices that indicate a subset of the plurality of reordered candidate reference blocks, the subset of the plurality of reordered candidate reference blocks including candidate reference blocks with first N smallest TM differences.

12. A method of video encoding performed in a video encoder, the method comprising:
partitioning a current block in a current frame into a first partition and a second partition via a split edge, template samples of the current block including a top template along a top side of the current block and a left template along a left side of the current block, the template samples being split via the split edge into a first template region adjacent to the first partition and a second template region adjacent to the second partition such that one of the top template and the left template is split by the split edge
determining a plurality of first candidate reference blocks for the first partition and a plurality of second candidate reference blocks for the second partition, each first candidate reference block having a respective first candidate template corresponding to a shape of the first template region, each second candidate reference block having a respective second candidate template corresponding to a shape of the second template region;
reordering at least one of the plurality of first candidate reference blocks and the plurality of second candidate reference blocks when a size of a template region of the one of the top template and the left template defined by the split edge is larger than a threshold value; and
encoding the current block into a video bitstream based on the reordered at least one of the plurality of first candidate reference blocks and the plurality of second candidate reference blocks.

13. The method of claim 12, wherein the determining further comprises:
determining the plurality of first candidate reference blocks for the first partition of the current block and the plurality of second candidate reference blocks for the second partition of the current block based on candidate reference blocks indicated by motion vectors (MVs) in a first reference list and in a second reference list.

14. The method of claim 12, wherein the determining further comprises:
determining the plurality of first candidate reference blocks for the first partition of the current block and the plurality of second candidate reference blocks for the second partition of the current block based on one of non-adjacent blocks and blocks in collocated reference frames of the current frame indicated by temporal motion vectors.

15. The method of claim 12, wherein the reordering further comprises:
determining a template-matching (TM) difference between the first template region of the template samples and each of the first candidate templates and a TM difference between the second template region of the template samples and each of the second candidate templates; and
reordering (i) the plurality of first candidate reference blocks for the first partition based on an ascending order of the TM differences between the first template region of the template samples and the first candidate templates and (ii) the plurality of second candidate reference blocks for the second partition based on an ascending order of the TM differences between the second template region of the template samples and the second candidate templates.

16. The method of claim 12, wherein the reordering further comprises:
when the top template is split into a first part and a second part, the first template region of the template samples includes the left template and the first part of the top template, and the second template region of the template samples includes the second part of the top template,
reordering the plurality of first candidate reference blocks for the first partition when a number of samples in a sample row of the first part of the top template is larger than the threshold value; and
reordering the plurality of second candidate reference blocks for the second partition when a number of samples in a sample row of the second part of the top template is larger than the threshold value.

17. The method of claim 12, wherein the reordering further comprises:
when the top template is split into a first part and a second part, the first template region of the template samples includes the left template and the first part of the top template, and the second template region of the template samples includes the second part of the top template,
reordering the plurality of first candidate reference blocks for the first partition when a width of a sample row of the first part of the top template is larger than the threshold value; and
reordering the plurality of second candidate reference blocks for the second partition when a width of a sample row of the second part of the top template is larger than the threshold value.

18. The method of claim 12, wherein the reordering further comprises:
when the left template is split into a first part and a second part, the first template region of the template samples includes the top template and the first part of the left template, and the second template region of the template samples includes the second part of the left template,
reordering the plurality of first candidate reference blocks for the first partition when a number of samples in a sample column of the first part of the left template is larger than the threshold value; and
reordering the plurality of second candidate reference blocks for the second partition when a number of samples in a sample column of the second part of the left template is larger than the threshold value.

19. The method of claim 12, wherein the reordering further comprises:
when the left template is split into a first part and a second part, the first template region of the template samples includes the top template and the first part of the left template, and the second template region of the template samples includes the second part of the left template,
reordering the plurality of first candidate reference blocks for the first partition when a height of a sample column of the first part of the left template is larger than the threshold value; and reordering the plurality of second candidate reference blocks for the second partition when a height of a sample column of the second part of the left template is larger than the threshold value.

20. A method of processing visual media data, the method comprising:

processing a video bitstream of the visual media data according to a format rule, wherein:

the bitstream includes coded information of a current block in a current frame and template samples of the current block, the template samples including a top template along a top side of the current block and a left template along a left side of the current block, the current block being partitioned into a first partition and a second partition via a split edge, and the template samples are split via the split edge into a first template region adjacent to the first partition and a second template region adjacent to the second partition such that one of the top template and the left template is split by the split edge; and the format rule specifies that:

a plurality of first candidate reference blocks for the first partition and a plurality of second candidate reference blocks for the second partition are determined, each first candidate reference block having a respective first candidate template corresponding to a shape of the first template region, each second candidate reference block having a respective second candidate template corresponding to a shape of the second template region;

at least one of the plurality of first candidate reference blocks and the plurality of second candidate reference blocks are reordered when a size of a template region of the one of the top template and the left template defined by the split edge is larger than a threshold value; and the current block is processed based on an index value received in the video bitstream and based on the reordered at least one of the plurality of first candidate reference blocks and the plurality of second candidate reference blocks.

* * * * *